Aug. 22, 1944.   D. F. CARIS ET AL   2,356,379
ENGINE BLOWER CONTROL
Filed May 19, 1943
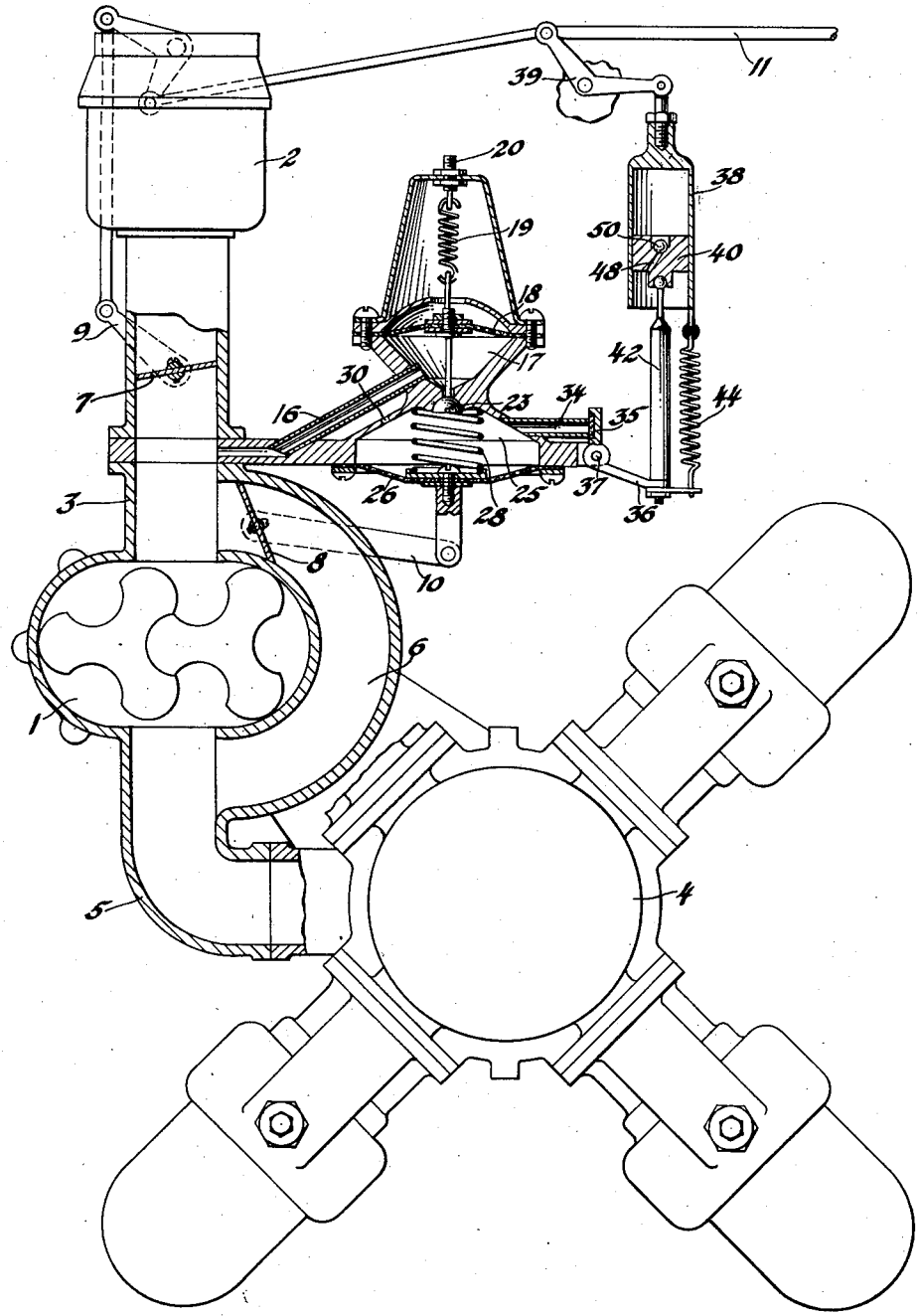
Inventors
Darl F. Caris &
Archie D. McDuffie
By Blackmore, Spencer & Flint
Attorneys Patented Aug. 22, 1944

2,356,379

UNITED STATES PATENT OFFICE 2,356,379

ENGINE BLOWER CONTROL

Darl F. Caris, Dearborn, and Archie D. McDuffie, Berkeley, Mich., assignors to General Motors Corporation, Detroit, Mich., a corporation of Delaware Application May 19, 1943, Serial No. 487,670

6 Claims. (Cl. 123—119)

This invention relates to internal combustion engines provided with a blower for supplying air or combustible mixture thereto, at superatmospheric pressure. It is particularly applicable to two stroke cycle engines working under a wide range of speed and load conditions.

More specifically, the invention relates to a two stroke cycle internal combustion engine with a positive displacement type of blower driven by the engine at a fixed speed ratio.

The object of the invention is an engine and blower combination having a regulatable throttle valve in the inlet to the blower, with means for maintaining a substantially fixed depression between the throttle valve and the blower, irrespective of the degree of throttle opening and the blower speed.

A more specific object of the invention is an internal combustion engine with a blower having a regulatable throttle valve in the blower inlet, with means for bypassing sufficient charge from the outlet to the inlet side of the blower to prevent the depression at the blower inlet from exceeding a pre-set maximum, except when rapid increase in the engine speed or torque is required.

A further object of the invention is an engine blower control in which the bypass valve is controlled by means responsive to the depression actually existing between the throttle valve and the blower inlet when this exceeds a certain value except when the throttle valve is suddenly opened for rapid acceleration of the engine.

According to the invention a vacuum chamber has a spring loaded diaphragm which is at all times subjected to the depression between the throttle valve and the blower, and controls a valve through which said chamber communicates with a second chamber in which there is a spring loaded diaphragm operatively connected to the bypass valve which is of the balanced butterfly type.

The arrangement is such that the second diaphragm is only subjected to the depression between the throttle valve and the blower when this exceeds a certain pre-set value sufficient to overcome the spring loading of the first diaphragm and open the valve which is controlled thereby. The actual depression in the second chamber when this said valve is open is modified by a constant bleed hole for atmospheric air and an opening for atmospheric air controlled by a valve which is operatively connected to the throttle valve through a dashpotted lost motion device.

The unopposed force of the spring in the second chamber is available to keep the bypass valve closed whenever the depression is below the pre-set minimum or for rapid acceleration of the engine at any time. At all other times the bypass valve is responsive to the depression in the blower inlet to maintain the depression constant.

The drawing shows in elevation, and partly in section, the application of the invention to a four-cylinder, radial, U-type, two-cycle engine.

The blower 1 has its inlet side connected to a carburetor 2 by a pipe 3, and its outlet side connected to the intake ports of an engine 4 by a pipe 5.

There is a bypass passage 6 around the blower from the outlet to the inlet side thereof.

In the inlet pipe 3, between the carburetor 2 and the bypass passage 6, there is a balanced butterfly throttle valve 7 with an operating arm 9, and in the bypass passage there is a balanced butterfly bypass valve 8 with an operating arm 10.

The throttle valve 7 is moved, manually or otherwise, by a rod 11.

Connected by a pipe 16 to the inlet side of the blower between the throttle valve 7 and the blower, is a chamber 17 provided with a diaphragm 18 loaded by a spring 19, the tension of which may be varied by a turning adjustment of a screw 20.

The diaphragm 18 is subjected to the depression on the inlet side of the blower, and when this is sufficient to overcome the tension of the spring 19, the diaphragm 18, along with a spherical valve 23 which is connected thereto, is moved in a direction to put the chamber 17 in communication with a second chamber 25 in which there is a diaphragm 26 operatively connected to the arm 10 of the bypass valve 8, which is resiliently urged towards its closed position by a spring 28.

Through the wall of the chamber 25 there is a constant small bleed hole 30 for atmospheric air, and a relief opening 34 for atmospheric air controlled by a valve 35.

The relief valve 35, which has an operating arm 36 and turns about a pivot axis 37, is operatively connected to the throttle rod 11, so as to be opened and closed along with the throttle valve 7, except as such movement is modified by lost motion between the cylinder 38 and plunger 40 of a dashpot device forming part of the linkage between the valve 35 and the throttle rod 11. The cylinder 38 is connected to the throttle rod 11 through a bell crank lever 39, and a piston rod 42 connects the plunger 40 to the operating arm 36 of the relief valve 35. A spring 44 between the arm 36 and the cylinder 38 tends to retain the valve 35 closed at all times.

The valve 23 with its diaphragm 18 and spring 19 insures that the diaphragm 26 which controls the bypass valve 8 is only subjected to a depression when the depression in the blower inlet exceeds the pre-set value determined by the spring loading of the valve 23. Because of this the spring 28 can be more responsive and weaker than it otherwise would need to be to hold the bypass valve closed at all depressions below the pre-set value.

The moment the pre-set value of the depression is exceeded and the valve 23 opens, the bypass valve will by the diaphragm 26 be caused to open to the requisite extent to reestablish the pre-set value. The actual value of the depression in the chamber 25 will depend on the relative areas of the spherical valve 23 and the openings for atmospheric air to bleed thereinto, consisting of the constant small bleed hole 30 and the relief opening 34 as varied by the valve 35.

The linkage including the dashpot device and spring 44 for controlling movement of the valve 35 is such that the valve 35 will remain closed upon slow and gradual opening movement of the throttle valve 7, there being sufficient leakage between the cylinder 38 and the plunger 40 to permit of this.

Rapid opening of the throttle valve 7 will, however, result in opening of the relief valve 35, which will insure that the bypass valve 8 is closed for at least a short period for maximum acceleration of the engine, before leakage between the cylinder 38 and plunger 40 permits the relief valve 35 to close and reestablish control of the bypass valve 8 by the depression in the blower inlet.

To permit quick closing of the throttle valve 7 irrespective of the position of the valve 35 and plunger 40, there is a duct 48 with a check valve 50 through the plunger 40 to relieve any vacuum in the cylinder 38.

The blower pressure control system thus provided responds quickly to the operating requirements of the engine and insures stability at all loads and speeds thereof.

We claim:

1. In combination, an internal combustion engine, a blower with an inlet and an outlet for supplying air to the engine, a throttle valve in the inlet to the blower, a bypass passage from the outlet to the inlet side of the blower at a point between the throttle valve and the blower, a bypass valve in the bypass passage, spring means tending to hold said bypass valve closed, a chamber communicating with the blower inlet between the throttle valve and the blower, a second chamber, a valve controlling communication between said first and second chambers, means responsive to the depression in said first chamber for opening said valve, and means responsive to the depression in said second chamber for opening said bypass valve.

2. The combination according to claim 1, in which the opening of the valve between said first and second chambers is resisted by adjustable spring means.

3. The combination according to claim 1, in which the depression in said second chamber is modified by the influx of atmospheric air through a bleed hole in the wall of said chamber.

4. The combination according to claim 1, with means to relieve the depression in said second chamber consisting of an opening for atmospheric air controlled by a valve which is operatively connected to the throttle valve.

5. The combination according to claim 1, with means to relieve the vacuum in said second chamber upon rapid opening of the throttle valve, said means consisting of an opening for atmospheric air, a valve controlling said opening, and control means for said valve including a dashpot device through which said valve is operatively connected to the throttle valve.

6. In combination, an internal combustion engine, a blower with an inlet and an outlet for supplying air to the engine, a throttle valve in the inlet to the blower, a bypass passage from the outlet to the inlet side of the blower at a point between the throttle valve and the blower, a bypass valve in the bypass passage, and means responsive to the depression between the throttle valve and the blower for opening said bypass valve, including a chamber with a diaphragm at all times subject to said depression, a valve controlled by said diaphragm for putting the chamber in communication with a second chamber, adjustable spring means opposing the depression on said diaphragm and tending to maintain said valve closed, and a spring loaded diaphragm in said second chamber operatively connected to the bypass valve.

DARL F. CARIS.
ARCHIE D. McDUFFIE.